US009475459B2

(12) United States Patent
Tieman

(10) Patent No.: US 9,475,459 B2
(45) Date of Patent: Oct. 25, 2016

(54) SELF-POWERED WIRELESS FUSE SWITCH

(71) Applicant: Craig A. Tieman, Westfield, IN (US)

(72) Inventor: Craig A. Tieman, Westfield, IN (US)

(73) Assignee: Tieman Vehicle Technologies LLC, Westfield, IN (US)

( * ) Notice: Subject to any disclaimer, the term of this patent is extended or adjusted under 35 U.S.C. 154(b) by 0 days.

(21) Appl. No.: 14/573,394

(22) Filed: Dec. 17, 2014

(65) Prior Publication Data

US 2015/0183386 A1 Jul. 2, 2015

Related U.S. Application Data

(60) Provisional application No. 61/921,414, filed on Dec. 28, 2013.

(51) Int. Cl.
*B60R 25/045* (2013.01)
*H01H 85/46* (2006.01)
*H01H 85/041* (2006.01)
*H01H 85/20* (2006.01)

(52) U.S. Cl.
CPC ............ *B60R 25/045* (2013.01); *H01H 85/46* (2013.01); *H01H 85/0417* (2013.01); *H01H 85/2015* (2013.01); *H01H 2085/466* (2013.01)

(58) Field of Classification Search
CPC ... B60R 16/00; B60R 16/005; B60R 16/023; B60R 16/0231; B60R 16/03; B60R 16/033; B60R 25/045; H01H 85/0417; H01H 85/2015; H01H 85/46; H01H 2085/466
See application file for complete search history.

(56) References Cited

U.S. PATENT DOCUMENTS

| 4,347,504 | A | * | 8/1982 | Murofushi | ............ | H01H 85/32 200/5 A |
| 5,251,093 | A | | 10/1993 | Dickey | | |
| 5,986,350 | A | * | 11/1999 | Hirano | .................... | B60R 16/03 307/10.1 |
| 6,611,201 | B1 | * | 8/2003 | Bishop | .................... | B60R 25/04 340/12.5 |
| 6,784,567 | B1 | * | 8/2004 | Klitzner | ................. | H01R 29/00 307/9.1 |

(Continued)

OTHER PUBLICATIONS

International Search Report for PCT/US14/71509 dated Apr. 16, 2015.

(Continued)

*Primary Examiner* — Jerrah Edwards
*Assistant Examiner* — Tamara Weber
(74) *Attorney, Agent, or Firm* — Andrus Intellectual Property Law, LLP

(57) ABSTRACT

A self-powered wireless fuse switch is disclosed that is a plug-in replacement for a fuse found in the electrical system of vehicles. The self-powered wireless fuse adds remote-controlled switching capabilities for short and long-range control of power to subsystems of a vehicle electrical system. The wireless fuse switch includes an internal transceiver that receives commands from a remote control unit and controls the position of an internal relay. The wireless control module interfaces with a fuse socket of the vehicle to selectively allow or interrupt power from the vehicle to the subsystem of the vehicle electrical system. The wireless fuse switch includes either a two-blade or three-blade harness assembly that allows the wireless fuse switch to be received within the fuse socket of the vehicle.

11 Claims, 5 Drawing Sheets

(56) References Cited

U.S. PATENT DOCUMENTS

| | | | |
|---|---|---|---|
| 7,132,762 B2 | 11/2006 | Metlitzky et al. | |
| 7,135,788 B2 | 11/2006 | Metlitzky et al. | |
| 7,266,507 B2* | 9/2007 | Simon | B60R 25/2018 705/35 |
| 7,530,851 B2* | 5/2009 | Parnis | H01R 13/68 439/503 |
| 8,041,779 B2* | 10/2011 | Habaguchi | G06Q 10/063 340/7.46 |
| 8,239,076 B2* | 8/2012 | McGarry | G08G 1/052 340/425.5 |
| 8,912,687 B2* | 12/2014 | Kesler | B60L 11/182 307/10.1 |
| 9,026,267 B2* | 5/2015 | Schwarz | B60R 25/04 701/2 |
| 9,047,494 B1* | 6/2015 | Smith | H04W 12/06 |
| 2004/0189493 A1 | 9/2004 | Estus et al. | |
| 2007/0026738 A1 | 2/2007 | Eichman | |
| 2007/0085418 A1* | 4/2007 | Casellato | H01M 10/46 307/10.1 |
| 2010/0073119 A1* | 3/2010 | Titokis | H01R 13/62944 337/205 |
| 2011/0215900 A1* | 9/2011 | Corradino | 340/5.53 |
| 2011/0309680 A1* | 12/2011 | Oleksiewicz | B60R 16/033 307/66 |
| 2012/0112531 A1* | 5/2012 | Kesler | B60L 11/182 307/9.1 |
| 2013/0203365 A1 | 8/2013 | Tieman | |
| 2014/0354045 A1* | 12/2014 | Snider | B60K 35/00 307/10.1 |

OTHER PUBLICATIONS

Written Opinion for PCT/US14/71509 dated Apr. 16, 2015.

* cited by examiner

SELF-POWERED WIRELESS FUSE SWITCH

CROSS-REFERENCE TO RELATED APPLICATION

The present application is based on and claims priority to U.S. Provisional Patent Application Ser. No. 61/921,414 filed Dec. 28, 2013, the disclosure of which is incorporated herein by reference.

BACKGROUND

This present disclosure generally relates to a fuse-protected vehicle electrical system. More specifically, the present disclosure relates to wireless connectivity enhancements of a singular design which can be added to existing vehicle electrical systems without special tools or training to permit external control of at least one electrical subsystem through a wireless link to mobile control devices.

Electrical and electronic subsystems in automotive vehicles are part of the overall vehicle electrical system and provide numerous functions related to the normal starting and driving operation, convenience, entertainment, access and security for vehicles. Every year, vehicle manufacturers introduce vehicles with increasing numbers of features which enhance convenience, entertainment, access and security. In addition, thieves continually attempt to learn how to circumvent vehicle security systems in an attempt to steal vehicles, which makes all vehicles vulnerable to theft despite the sophistication of their original, electronic equipment. Vehicles which have been manufactured and sold have specific features that will always remain the same over time and will not benefit from the introduction of enhanced features that new vehicles enjoy.

In recent years, the rapid and widespread growth in long-range wireless connectivity and sophisticated hand-held mobile devices with touch-type graphical user interfaces and short or long-range wireless connectivity has led to the proliferation of machine-to-machine connectivity solutions and "anywhere at any time" device interactivity. Consumers now expect all of their vehicles, homes and devices to be connected and able to be interacted with via their mobile technology from anywhere and at any time.

For many years, aftermarket vehicle electronics suppliers have been offering retrofittable security and convenience subsystems to expand the capabilities available to vehicle owners. Security system enhancements are available to enhance the existing vehicle security features through connections to existing vehicle electronic systems to override normal operation and create greater barriers to thieves who must overcome these systems to steal a vehicle. Other aftermarket system enhancements include the addition of remote vehicle start and keyless entry. The primary limitations of these systems include the need for extensive custom engineering efforts by the suppliers for each vehicle to work with the unique electronics of the vehicles as well as the need for consumers to pay a professional technician for all installation efforts due to the technical complexity of the different vehicle installations. Consequently, these installations are generally expensive for consumers to consider.

One aftermarket supplier, Dynamco of Australia, offers a plug-in wireless relay replacement to enable RF control of vehicle systems. This system includes a relay that does not have self-powering and must obtain power from the relay socket, if power is available at this location. In many vehicles, the relay socket does not supply the necessary power and in those cases, additional wires must be run to obtain power and/or ground from the vehicle to operate. Additionally, there are many different relay configurations in vehicles, which requires a wide variety of part numbers and individual relays to address the vehicle market. Also, there are a large number of vehicles which do not have user-replaceable relays to use for adding wireless connectivity via a wireless relay replacement.

Presently, no wireless connectivity enhancement system of a singular design to control a fuse-protected vehicle system, which is self-powered and controlled by mobile devices, of all existing or new vehicles and devices for installation without special tools or training currently exists.

SUMMARY

The present disclosure relates to a self-powered wireless fuse switch that is a plug-in replacement for a fuse, typically found in vehicles, which would add a remote-controlled switch for short and long-range control of power to vehicle subsystems (e.g. disable engine start, disable ignition or fuel pump, enable remote starting). A wireless switch module contains a power source (replaceable battery) which operates an internal radio frequency (RF) transceiver and battery monitor for communicating with an external RF transceiver. The external RF transceiver represents part of a separate control device. The internal RF transceiver receives control commands and passes the control commands to a controller to operate a relay. The relay is connected in series with a fuse between a vehicle battery and vehicle subsystem being controlled by the separate controlling system. Automotive fuses come in various sizes and connector pin configurations but all serve the same purpose: to protect wiring from overcurrents due to short circuits. To address this with a singular design, a separate wiring harness assembly which connects to the wireless switch module will terminate with a specific fuse configuration and number of blades and also contain a matching fuse socket to accept the original fuse being replaced. The separate control device can be either a mobile device with a short-range RF transceiver or a gateway telematics device which extends the range of the wireless switch module to reach a remotely-located mobile device.

Accordingly, this system could be used by any user with simple instructions to replace an existing vehicle fuse with a remotely-controlled wireless fuse switch which will permit the vehicle owner to remotely deactivate or deactivate the power for various vehicle electrical and electronic functions. Remote control can be extended to the user's mobile devices over wireless links to provide short to long-range control.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
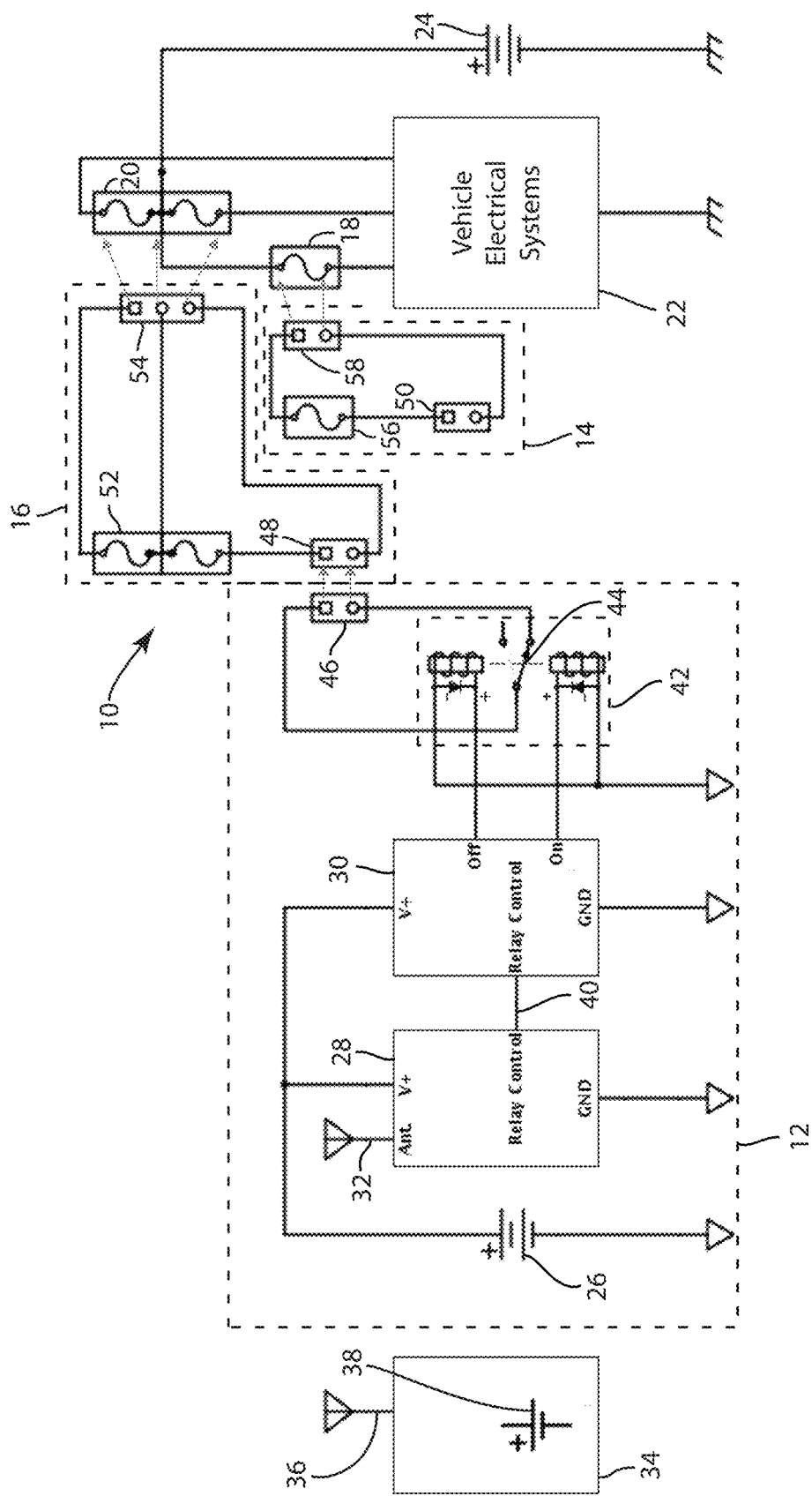
FIG. 1 is a schematic diagram showing the components of the self-powered wireless fuse switch.

FIG. 1 is a schematic diagram of a self-powered, wireless fuse switch 10 constructed in accordance with the present disclosure. The wireless fuse switch 10 includes a wireless control module 12 that interfaces with either a two-blade harness assembly 14 or a three-blade harness assembly 16. The two-blade and three-blade harness assemblies 14, 16, respectively, allow the wireless fuse switch 10 to interface with either a two-blade socket 18 or a three-blade socket 20 of a vehicle electrical system 22. As shown in FIG. 1, both the two-blade socket 18 and the three-blade socket 20 are positioned between the vehicle electrical system 22 and the vehicle battery 24. The vehicle electrical system 22 includes a plurality of electrical subsystems, such as a keyless entry system, a remote starting system or other similar systems within the vehicle. The wireless fuse switch 10, by utilizing either the two-blade harness assembly 14 or the three-blade harness assembly 16, can be connected to the vehicle electrical system 22 through one of the respective two-blade sockets 18 or the three-blade socket 20. Although a single two-blade socket 18 and a single three-blade socket 20 are shown in FIG. 1, it should be understood that the vehicle can and typically will include multiple two-blade and three-blade sockets, where each of the sockets are connected between the vehicle battery 24 and one of the respective electrical subsystems. The two-blade socket 18 receives a two-blade vehicle fuse while the three-blade socket 20 receives a three-blade fuse.

The wireless control module 12 includes an internal battery 26 that provides power for the internal operating components contained within the wireless control module 12. The battery 26 provides power for both an RF transceiver and battery monitor 28 and a relay controller 30. The RF transceiver 28 includes an antenna 32 that can receive wireless control signals from an external control device 34. In the embodiment illustrated, the control device may be a wireless mobile device, such as a smart phone, that includes an internal RF transceiver that is able to transmit wireless control signals through an antenna 36. The control device 34 includes a graphical user interface and an internal battery 38 that provides the operating power necessary to transmit wireless control signals from the control device 34 to the wireless control module 12. Although the control device 34 is shown as being a separate user operable device, in an alternate embodiment, the control device 34 may be a gateway device with an RF transceiver located within the vehicle that communicates wirelessly to the RF transceiver 28 contained within the wireless control module 12.

When the RF transceiver 28 contained within the wireless control module 12 receives a control signal from the control device 34, the RF transceiver 28 communicates to the relay controller 30 through control line 40. When the relay controller 30 receives a control signal along line 40, the relay controller 30 can control operation of a relay 42. In the embodiment shown, the relay 42 is a bi-stable latching relay that only requires power briefly to transition to the commanded position (open/closed) and holds the commanded position indefinitely without the application of any additional power. The use of the bi-stable latching relay allows the relay 42 to maintain the commanded position without the need for additional power draw from the internal battery 26. In the embodiment shown in FIG. 1, the internal switching contact element 44 is shown in a closed position. The operation of the relay controller 30 to transmit control signals to the relay 42 is well known.

As illustrated in FIG. 1, the wireless control module 12 further includes a module connector 46 that allows the wireless control module 12 to be connected to either the two-blade harness assembly 14 or the three-blade harness assembly 16. In the embodiment shown, the module connector 46 is connected to the harness connector 48 of the three-blade harness assembly 16. A similar harness connector 50 is included in the two-blade harness assembly 14 such that the wireless control module 12 can be connected to either of the harness assemblies 14 or 16.

The three-blade harness assembly 16 further includes the harness fuse socket 52 that is configured to receive a three-blade fuse. The harness fuse socket 52 is similar to the three-blade fuse socket 20 included as part of the vehicle electrical system. The harness fuse socket 52 is configured to receive the conventional three-blade fuse that is removed from the three-blade socket 20 during installation of the wireless fuse switch 10 of the present disclosure.

The three-blade harness assembly 16 further includes a fuse connector 54 sized to be received within the three-blade socket 20 of the vehicle electrical system. In this manner, the combination of the wireless control module 12 and three-blade housing assembly 16 can be installed into the three-blade socket 20 of the vehicle electrical system.

As described previously, the wireless fuse switch 10 can alternatively include the two-blade harness assembly 14. The two-blade harness assembly 14 includes a harness fuse socket 56 and a fuse connector 58. The harness fuse socket 56 is configured to receive a two-blade fuse removed from the two-blade socket 18 during installation of the wireless fuse switch 10. The fuse connector 58 allows the two-blade harness assembly 14 to be connected directly to the two-blade socket 18 of the vehicle electronics system.

Figure 2A:
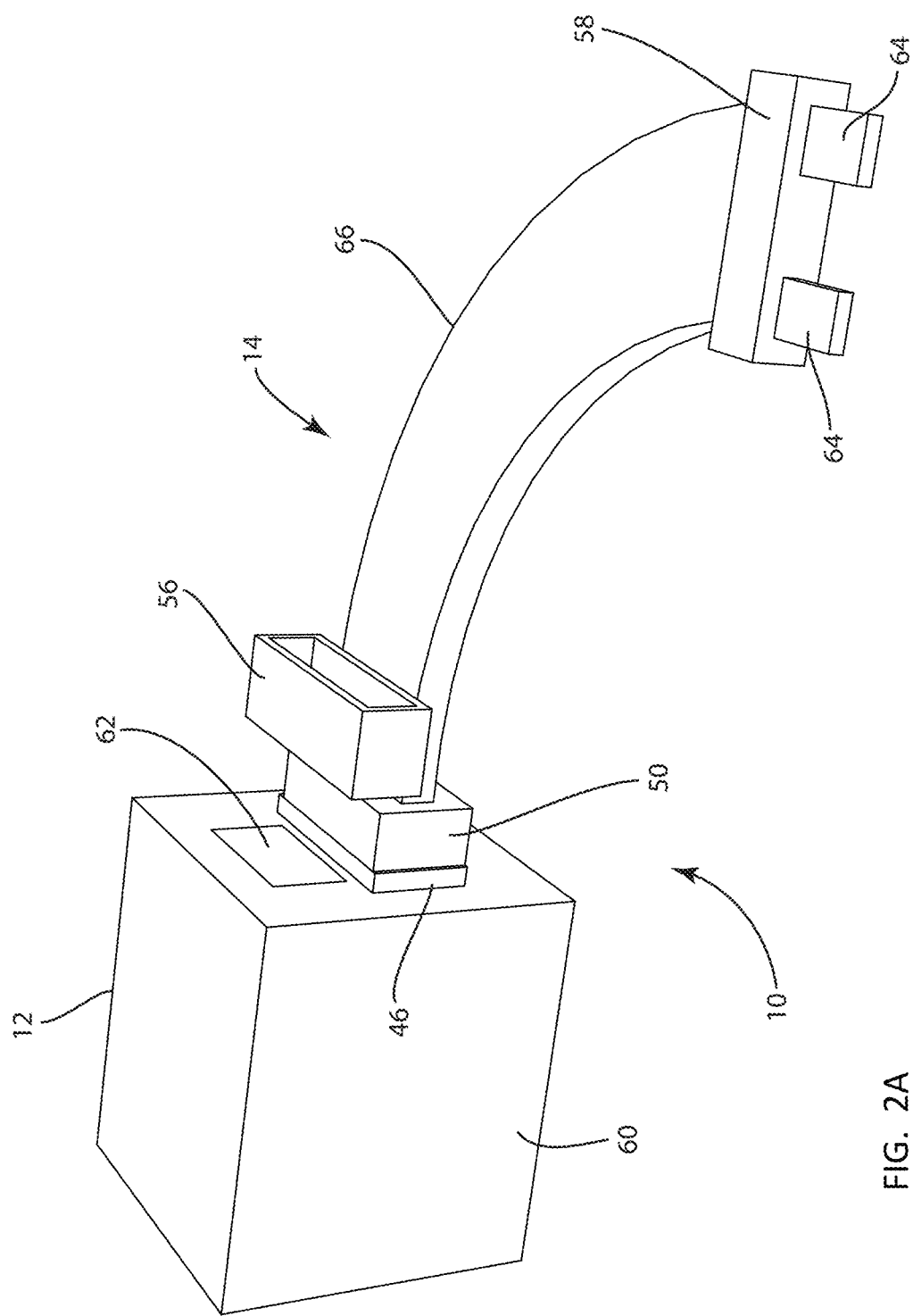
FIG. 2A is an isometric view of the self-powered wireless fuse switch including a two-blade harness assembly.

FIG. 2A illustrates an isometric view of the wireless fuse switch 10 in an embodiment in which it is configured for receipt within the two-blade socket of the vehicle electrical system. As illustrated in FIG. 2A, the wireless fuse switch 10 includes the wireless control module 12 and the two-blade harness assembly 14. The wireless control module 12 includes an outer housing 60 having a battery access cover 62. The two-blade harness assembly 14 includes the fuse connector 58 that includes a pair of blades 64 that allows the fuse connector 58 to be received within the two-blade socket 18 of the vehicle electrical system. The fuse connector 58 in the embodiment shown in FIG. 2A includes an extended harness cable 66 that includes at its opposite end, the harness connector 50. The harness connector 50, in turn, is received within the module connector 46.

The two-blade harness assembly 14 further includes the harness fuse socket 56 that can receive the two-blade fuse removed from the vehicle electrical system. In this way, the two-blade harness assembly 14 provides for over current protection by utilizing the fuse that forms part of the vehicle electrical system. The wireless fuse switch 10 thus replaces the fuse within the vehicle electrical system and provides for enhanced functionality, as will be described in greater detail below.

Figure 2B:
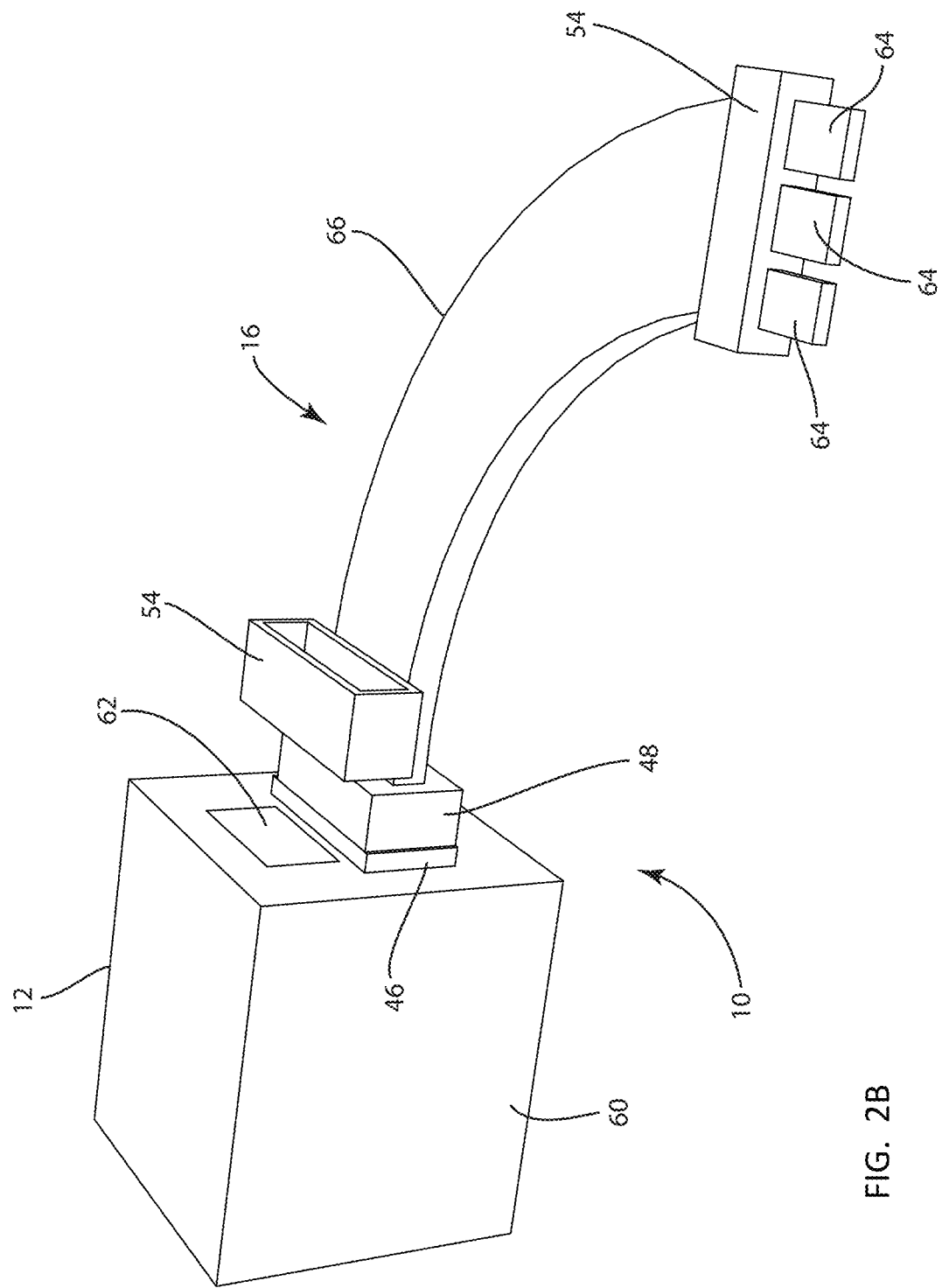
FIG. 2B is an isometric view of the self-powered wireless fuse switch for a three-blade harness assembly.

FIG. 2B is a view similar to FIG. 2A but shows the wireless fuse switch 10 incorporating the three-blade harness assembly 16. The three-blade harness assembly includes the three-blade fuse connector 54 having three individual blades 64 that are received within the three-blade socket 20 of the vehicle electronics system. The fuse connector 54 is mounted on one end of the harness cable 66 while the opposite end of the harness cable 66 includes the harness connector 48. The harness connector 48 is received within the module connector 46 formed as part of the wireless control module 12. A fuse connector 54 is formed as part of the three-blade harness assembly 16 and receives the three-blade fuse removed from the three-blade socket 20 that forms part of the vehicle electronic system.

Figure 3:
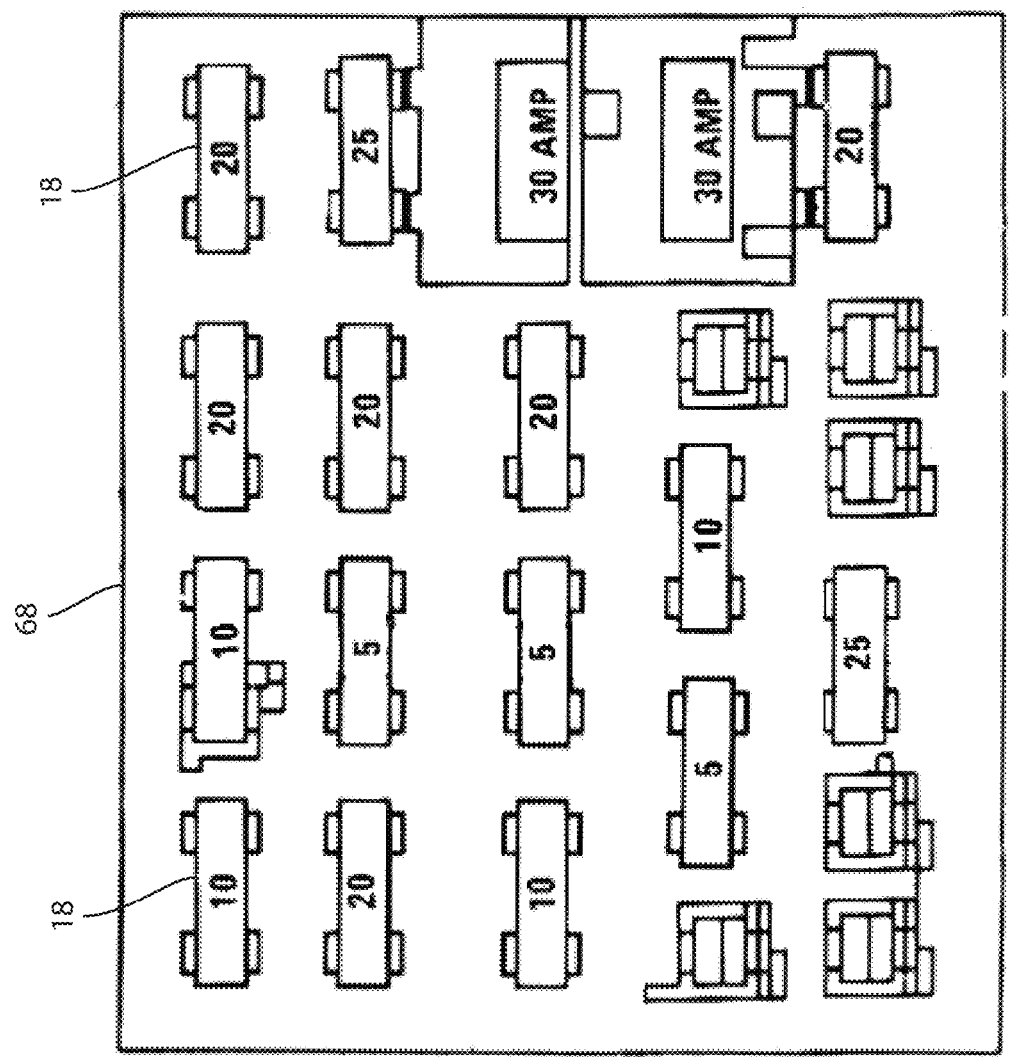
FIG. 3 is a typical vehicle electrical fuse block showing the location of connection points for the harness assembly of FIG. 2A.
Figure 4:
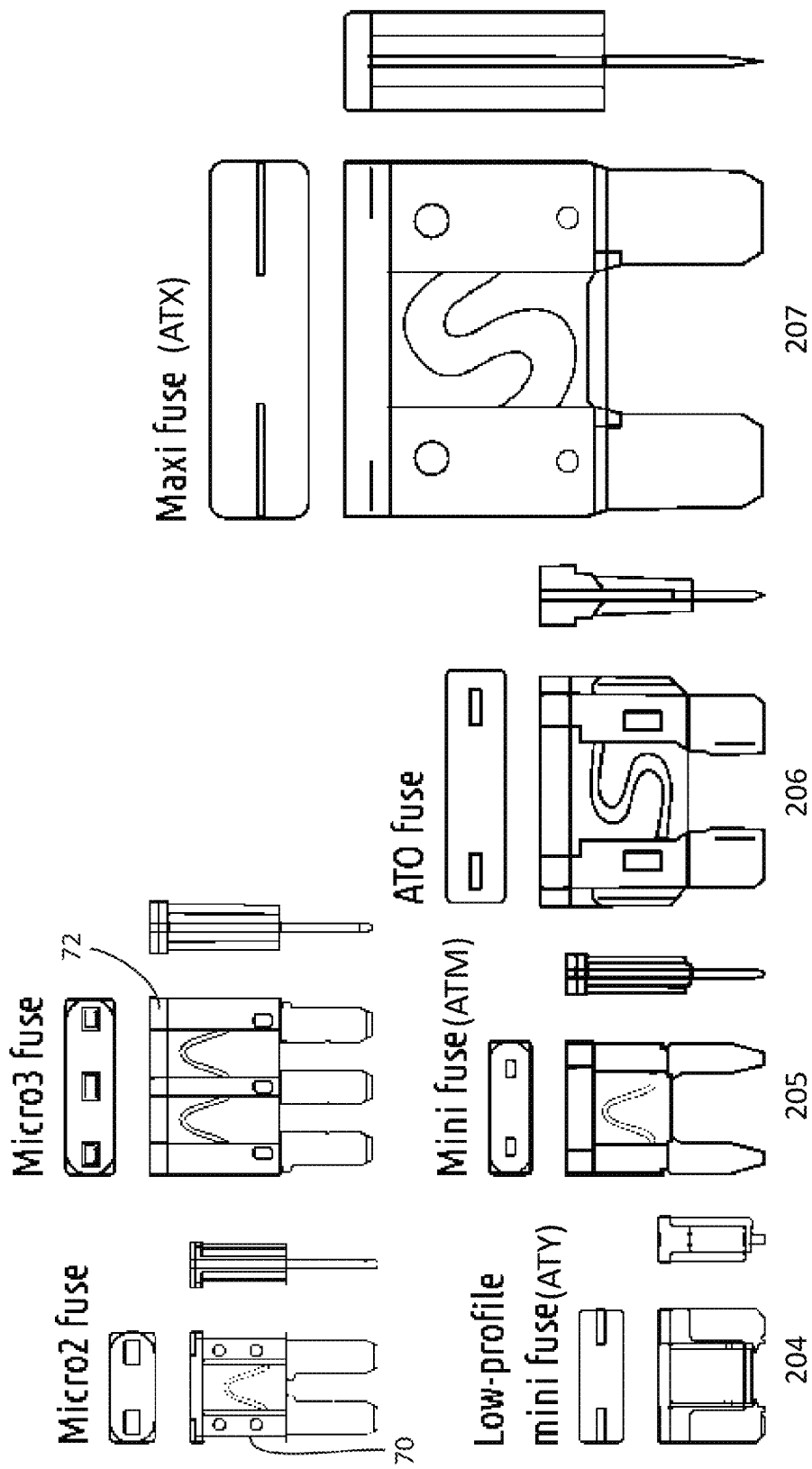
FIG. 4 is an illustration of the different types of automotive vehicle fuses to be supported for the system of FIGS. 2A and 2B.

Referring now to FIG. 3, thereshown is a typical vehicle fuse block 68 that includes a series of two-blade fuse sockets 18 that can receive different types of fuses, such as shown in FIG. 4. The individual fuses shown in FIG. 4 can have various different ratings. The fuses in FIG. 4 include a two-blade fuse 70 and a three-blade fuse 72, as is conventionally utilized within a vehicle electrical system. The fuse block 68 shown in FIG. 3 is typically contained within the engine compartment of a vehicle. However, the location of the fuse block 68 can vary depending upon the individual vehicle.

Referring back to FIG. 1, the vehicle electrical system 22 can include a variety of different electrical subsystems contained within a vehicle. For example, the vehicle electrical system 22 could include a remote starting, subsystem, the typical ignition subsystem within the vehicle, which may include a pushbutton start, or other types of standard electronic operating components. Each of the individual subsystems of the vehicle electrical system 22 receives power from the vehicle battery 24 through one of the fuse sockets, such as the two-blade socket 18 or the three-blade socket 20. If the electronic subsystem draws an overcurrent, such as due to an unintentional grounding due to a loose wire or some other malfunction, the fuse contained within either one of the two fuse sockets 18, 20 interrupts electrical power to the device. When the fuse has been blown, the electronic subsystem within the vehicle is rendered inoperative.

The wireless fuse switch 10 operates in the same manner as a conventional fuse. Specifically, when the wireless fuse switch opens, replicating a blown fuse, electrical power from the vehicle battery 24 is interrupted to the subsystem within the vehicle. The wireless fuse switch 10 constructed in accordance with the present disclosure allows a user to selectively replicate an open fuse by controlling the position of the relay 42 contained within the wireless control module 12. When the contact element 44 is open, power from the vehicle battery 24 is interrupted and prevented from reaching the electrical subsystem contained within the vehicle. Likewise, when the contact element 44 is in the closed position shown in FIG. 1, power from the battery 24 can reach the electrical subsystem contained within the vehicle.

As discussed previously, the position of the relay 42 is controlled by the user through the control device 34. If the user desires to change the position of the relay 42, the user can enter such a command through a user interface contained on the control device 34. The RF transceiver contained within the control device 34 sends an electronic, wireless control signal that is received by the antenna 32 contained on the RF transceiver 28 contained within the wireless control module 12. The wireless signal transmitted from the control device 34 to the wireless control module 12 can be relayed utilizing a variety of wireless communication techniques, such as a wireless signal transmitted over the Internet. In this manner, the control device 34 can be at a location remote from the vehicle and the installed wireless fuse switch 10 and can be used to selectively control the operation of one of the electrical subsystems of the vehicle electrical system 22.

In other embodiments, the RF transceiver in the control device 34 and RF transceiver and battery monitor 28 could be replaced by power-line carrier (PLC) transceivers to communicate controlling signals over vehicle wiring. Instead of an internal wireless switch module battery 26 which requires periodic replacement, a low-current trickle charger could be powered by current flowing from the vehicle battery to vehicle systems through the wireless switch module 10 to charge either a rechargeable battery or a supercapacitor. Instead of a mechanical bi-stable latching relay 42, a solid-state relay could be substituted if suitable power-handling capabilities were available. Instead of plugging into a two-blade vehicle fuse socket 18 or three-blade fuse socket 20, the self-powered fuse switch could be directly plugged into an available relay socket. With a wireless switch module 10 equipped with multiple relays and with additional fuse connectors in the wiring harness, additional vehicle features could be enabled by using relays to bypass vehicle switches and enable features such a remote engine start to be provided via plug-in fuse replacements.

Referring back to FIGS. 1 and 2A, 2B, the operation of the wireless fuse switch 10 of the present disclosure will now be described. Initially, the user would locate the specific two-blade socket 18 or three-blade socket 20 in the vehicle fuse block for the electrical subsystem of the vehicle that is desired to be externally controlled. Once the fuse socket has been identified, the user removes the fuse from the socket. Once the fuse has been removed, the correct two-blade harness assembly 14 or three-blade harness assembly 16 is inserted into the vehicle fuse socket utilizing either the two-blade connector 58 or the three-blade connector 54. Once the proper harness assembly has been installed, the removed fuse is installed into either the harness fuse socket 52 or the harness fuse socket 56. In this manner, the removed vehicle fuse remains in the system and will open upon a short circuit condition.

Once the proper harness assembly 14, 16 is installed, the wireless control module 12 is connected utilizing the module connector 46. Once the wireless module 12 is connected, the user can communicate to the wireless module 12 from the control device 34 after completing a first-time pairing procedure. A software application running on the control device 34 allows the control device to communicate to the RF transceiver 28. Commands are passed from the RF transceiver 28 to the relay controller 30 over the relay control line 40. The relay controller 30 would then interpret those commands and send the appropriate relay open or relay closed command to the windings of the bi-stable latching relay 42. The two-blade harness assembly 14 or the three-blade harness assembly 16 will provide the necessary interface to the respective fuse socket that forms part of the vehicle electrical system to either supply or remove the vehicle battery 24 from the fuse-protected vehicle electrical system 22.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A system for remotely controlling the operation of at least one electrical subsystem that receives power from a vehicle battery through a fuse mounted within a fuse socket of a vehicle electrical system, the system comprising:
- a control device having a transceiver for transmitting control commands;
- a wireless control module including an internal power supply and a control module transceiver that communicates with the transceiver of the control device to receive the control commands;
- a relay contained within the wireless control module and movable between an open position and a closed position based upon the received control commands; and
- a harness assembly including a fuse connector that is received in the fuse socket to connect the relay to the fuse socket of the vehicle electrical system and a harness fuse socket that receives the fuse removed from the fuse socket, wherein the wireless control module includes a module connector that removably connects to the harness assembly.

2. The system of claim 1 wherein the internal power supply is a battery.

3. The system of claim 1 wherein the relay is a latching relay.

4. The system of claim 1 wherein the wireless control module includes a relay controller in communication with both the control module transceiver and the relay to control the position of the relay based upon the control commands.

5. The system of claim 1 wherein the control device is a smartphone.

6. The system of claim 1 wherein the harness assembly includes either a three-blade fuse connector or a two-blade fuse connector.

7. A wireless fuse switch for use with an electrical system of a vehicle having a vehicle battery connected to provide power to at least one electrical subsystem through a fuse contained within a fuse socket, the wireless fuse switch comprising:
- a wireless control module including a control module transceiver that receives wireless control commands;
- a relay contained within the wireless control module and movable between an open position and a closed position based upon the received control commands;
- a power supply contained within the wireless control module to power both the control module transceiver and the relay; and
- a harness assembly including a fuse connector that is received in the fuse socket to connect the relay to the fuse socket of the vehicle electrical system and a harness fuse socket that receives the fuse removed from the fuse socket, wherein the wireless control module includes a module connector that removably connects to the harness assembly.

8. The wireless fuse switch of claim 7 wherein the relay is a latching relay.

9. The wireless fuse switch of claim 7 wherein the wireless control module includes a relay controller in communication with both the control module transceiver and the relay to control the position of the relay based upon the received control commands.

10. The wireless fuse switch of claim 7 further comprising a two-blade harness assembly and a three-blade harness assembly, wherein the relay is connected to either the two-blade harness assembly or the three-blade harness assembly based upon the configuration of the fuse socket.

11. The wireless fuse switch of claim 10 wherein the module connector selectively connects the wireless control module to either the three-blade harness assembly or the two-blade harness assembly.

* * * * *